United States Patent [19]

Sommer et al.

[11] 4,159,265
[45] Jun. 26, 1979

[54] PHENYLAZOPYRAZOLO DYESTUFFS INCLUDING DISULFIMIDE SUBSTITUENT

[75] Inventors: Richard Sommer, Leverkusen; Gerhard Wolfrum, Bergisch-Neukirchen; Gerhard Büttner, Cologne, all of Fed. Rep. of Germany

[73] Assignee: Bayer Aktiengesellschaft, Leverkusen, Fed. Rep. of Germany

[21] Appl. No.: 899,830

[22] Filed: Apr. 25, 1978

Related U.S. Application Data

[62] Division of Ser. No. 486,907, Jul. 9, 1974.

[30] Foreign Application Priority Data

Jul. 14, 1973 [DE] Fed. Rep. of Germany ....... 2335849

[51] Int. Cl.² ............................................. C09B 29/36
[52] U.S. Cl. .................................... 260/162; 260/165; 260/207
[58] Field of Search .......................... 260/556 SN, 162

[56] References Cited

U.S. PATENT DOCUMENTS

| 3,136,752 | 6/1964 | Jung et al. ............................. 260/162 |
| 3,988,310 | 10/1976 | Gerlach et al. .................. 260/162 X |
| 4,055,557 | 10/1977 | Wiesel et al. ........................ 260/162 |

FOREIGN PATENT DOCUMENTS

| 1039676 | 9/1958 | Fed. Rep. of Germany. |
| 774819 | 5/1957 | United Kingdom ..................... 260/162 |
| 831840 | 4/1960 | United Kingdom. |
| 864474 | 5/1961 | United Kingdom. |
| 888499 | 1/1962 | United Kingdom ..................... 260/162 |

Primary Examiner—Allen B. Curtis
Attorney, Agent, or Firm—Plumley & Tyner

[57] ABSTRACT

Monoazo dyestuffs of the formula

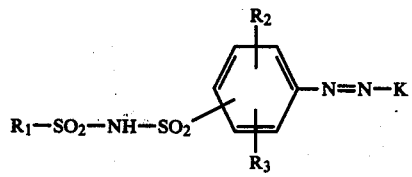

wherein
K represents the radical of a couping component K-H of the formula

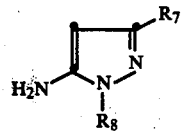

said dyestuff being suitable for the dyeing of synthetic fibre materials especially those from polyamides.

2 Claims, No Drawings

PHENYLAZOPYRAZOLO DYESTUFFS INCLUDING DISULFIMIDE SUBSTITUENT

This is a division of Ser. No. 486,907, filed July 9, 1974.

The invention relates to monoazo dyestuffs which in the form of the free acid correspond to the general formula $$R_1-SO_2-NH-SO_2-\text{C}_6H_3(R_2)(R_3)-N=N-K \quad (I)$$

and to their preparation and use for dyeing synthetic fibre materials, especially polyamide fibre materials.

In the general formula (I)

$R_1$ represents an aromatic radical, an aliphatic radical with 1-4 C atoms or a dialkylamino radical, in which the alkyl groups contain 1-4 C atoms, $R_2$ represents hydrogen, halogen, alkyl with 1-4 C atoms, alkoxy with 1-4 C atoms or trifluoromethyl, $R_3$ represents hydrogen, halogen, alkyl with 1-4 C atoms, alkoxy with 1-4 C atoms or trifluoromethyl and K represents the radical of a coupling component K-H of the formulae (II), (III) and (IV)

(structures II, III, IV with substituents $R_4, R_5, R_6, (SO_3H)_m, R_7, R_8, H_2N, R_9, R_{10}, R_{11}, R_{12}$)

(II)   (III)   (IV)

wherein $R_4$ represents alkyl with 1-4 C atoms or aryl, $R_5$ represents hydrogen or unsubstituted alkyl with 1-4 C atoms, $R_6$ represents hydrogen, nitrile, halogen, alkyl with 1-4 C atoms or alkoxy with 1-4 C atoms, $R_7$ represents hydrogen, alkyl with 1-4 C atoms, aryl, a carboxylic acid ester group or a carboxylic acid amide group, $R_8$ represents hydrogen, alkyl, cycloalkyl, aryl or the radical of a heterocyclic compound, $R_9$ represents hydrogen, halogen, alkyl with 1-4 C atoms, alkoxy with 1-4 C atoms or acylamino, $R_{10}$ represents hydrogen, halogen, alkyl with 1-4 C atoms, alkoxy with 1-4 C atoms or aryloxy, $R_{11}$ represents hydrogen or alkyl, $R_{12}$ represents hydrogen or alkyl and m represents 0 or 1.

The disulphimide group of the formula (I) is in the ortho-, meta- or para-position relative to the azo bridge.

Suitable aromatic radicals $R_1$ are, in particular, phenyl radicals. The phenyl radicals can possess further substituents, for example $C_1-C_4$-alkyl, $C_1-C_4$-alkoxy, halogen, nitrile, nitro and the like. Phenyl and tolyl are preferred. Further suitable aromatic radicals $R_1$ are 1- and 2-naphthyl radicals. The aliphatic radicals $R_1$ are, in particular, alkyl radicals.

A suitable dialkylamino $R_1$ is, for example, dimethylamino, diethylamino or dibutylamino.

Alkyl and alkoxy $R_2$, $R_3$, $R_9$ and $R_{10}$ can be substituted further, for example by halogen, nitrile, hydroxyl or optionally substituted phenyl, for example $-CH_3$, $-C_2H_5$, $-C_3H_7$, $-CH_4H_9$, $-C_2H_4CN$ and $-CH_2-C_6H_5$.

A suitable alkoxy $R_2$, $R_3$, $R_6$, $R_9$ and $R_{10}$ can be substituted by hydroxyl or phenyl, for example $-OCH_3$, $-OC_2H_5$, $-OC_3H_7$, $-OC_4H_9$, $-OCH_2CH_2OH$ and $-OCH_2C_6H_5$.

A suitable aryloxy $R_{10}$ is, for example, phenoxy, which can be substituted by $C_1-C_4$-alkyl, especially phenoxy and tolyloxy.

A suitable alkyl $R_4$, $R_6$ and $R_7$ is, in particular, unsubstituted alkyl, such as $-CH_3$, $-C_2H_5$, $-n-C_3H_7$, $-i-C_3H_7$ and $-n-C_4H_9$.

A suitable aryl $R_4$ is, in particular, phenyl or naphthyl which are optionally substituted further by halogen, $C_1-C_4$-alkyl or phenyl, for example phenyl, naphthyl, p-biphenyl, 4-chlorophenyl, 2,4-dichlorophenyl or 4-methylphenyl.

A suitable aryl $R_7$ is preferably phenyl, which can be substituted, for example by halogen, such as fluorine, chlorine and bromine, alkyl groups or alkoxy groups each with 1-4 C atoms, especially phenyl and o-, m- and p-tolyl.

A suitable aryl $R_8$ is preferably phenyl, which can optionally be substituted by non-ionic substituents, such as halogen, nitrile, nitro, acylamino, $C_1-C_4$-alkyl, trifluoromethyl, $C_1-C_4$-alkoxy and amino groups which are optionally substituted by $C_1-C_4$-alkyl groups. A suitable acylamino is that mentioned for $R_9$.

Suitable halogen atoms $R_2$, $R_3$, $R_6$, $R_8$, $R_9$ and $R_{10}$ are fluorine, chlorine and bromine.

A suitable alkyl $R_8$ is in particular $C_1-C_4$-alkyl, for example $CH_3$, $C_2H_5$, n- and iso-$CH_3H_7$ and n-, sec.- and iso-$C_4H_9$, which can be substituted further, for example by hydroxyl, chlorine, bromine, nitrile, carbamoyl, alkoxy, especially $C_1-C_4$-alkoxy, alkoxycarbonyl, especially $C_1-C_4$-alkoxycarbonyl, or phenylalkyl, for example benzyl or 2-phenethyl.

A suitable cycloalkyl $R_8$ has 5 to 7 C atoms and is, for example, cyclopentyl or cyclohexyl.

Suitable heterocyclic radicals $R_8$ are, for example, the 3-sulpholanyl radical or the 2-furfuryl radical.

A suitable carbonamide $R_7$ is, for example, that corresponding to the formula $$-CO-N\begin{matrix}R_{13}\\R_{14}\end{matrix}$$

wherein $R_{13}$ and $R_{14}$ represent hydrogen or alkyl with 1-4 C atoms.

The following may be mentioned as examples: carbonamide, N-methylcarbonamide, N,N-dimethylcarbonamide, N-ethyl-carbonamide, N,N-diethylcarbonamide and N-butylcarbonamide.

Suitable carboxylic acid ester groups $R_7$ are, for example, carboxylic acid $C_1-C_4$-alkyl esters, such as the methyl, ethyl or butyl ester.

A suitable acylamino R₉ is in particular formylamino, alkylcarbonylamino, cycloalkylcarbonylamino, alkenylcarbonylamino, phenylcarbonylamino, hetarylcarbonylamino, alkylsulphonylamino, phenylsulphonylamino and alkoxycarbonylamino, in which alkyl and phenyl can be further substituted by the substituents mentioned for R₈, and alkyl, alkenyl and alkoxy preferably have 1–4 C atoms. Cycloalkyl preferably has 5–7 ring members.

A suitable acylamino R₉ is, for example, formylamino, acetylamino, propionylamino, β-chloropropionylamino, butyrylamino, methylsulphonylamino, phenylsulphonylamino, hydroxyacetylamino, phenoxyacetylamino, benzoylamino, p-chlorobenzoylamino, 2,5-dichlorobenzoylamino, phenacetylamino, ethoxycarbonylamino, methoxycarbonylamino and propoxycarbonylamino. Suitable hetarylcarbonyl compounds are, for example, furanoyl and thenoyl.

Alkyl R₁₁ and R₁₂ is in particular understood as alkyl with 1–4 C atoms, which can optionally be substituted further, for example by halogen, such as chlorine and bromine, by nitrile, hydroxyl, alkoxy with 1–4 C atoms, aryloxy, such as phenoxy or tolyloxy, or benzyloxy, by C₂–C₅-alkylcarbonyloxy, alkoxycarbonyloxy or alkoxycarbonyl, each with 1–4 C atoms in the alkoxy radical, or by aryl, for example by phenyl which is optionally substituted further.

A suitable alkyl R₁₁ and R₁₂ is, for example, —CH₃, —C₂H₅, —C₃H₇, —C₄H₉, —CH₂-CH₂—CN, —CH₂-CH₂-OH, —CH₂-CH₂-O-CH₃, —CH₂-CH₂—O-CO—CH₃, —CH₂-CH₂-O—CO—C₂H₅, —CH₂-CH₂—O—CO-C₃H₇, —CH₂—CH₂-O-CO-OCH₃, -CH₂-CH₂-O—OC—OC₂H₅, —CH₂-CH₂—O—CO-OC₄H₉, —CH₂-C₆H₅, —CH₂-CH₂-C₆H₅, —CH₂—CH₂—Cl, —CH₂-CH₂—COO—CH₃, CH₂—CH₂—COOC₂H₅,

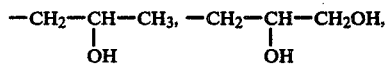

—CH₂—CH₂-O-CO-C₆H₅, —CH₂-CH₂-O—CO—CH₂-C₆H₅ and —CH₂—CH₂—O-CH₂-C₆H₅.

Preferred dyestuffs are those which in the form of the free acid correspond to the general formula

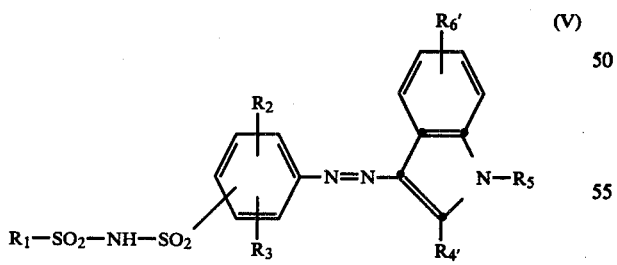

wherein
R₁, R₂, R₃ and R₅ have the abovementioned meaning and
R₄' represents unsubstituted alkyl with 1–4 C atoms, or optionally substituted phenyl and
R₆' represents hydrogen, halogen or alkyl with 1–4 C atoms and the disulphimide group is in the o-, m- or p-position relative to the azo bridge,
and especially those which in the form of the free acid correspond to the general formula

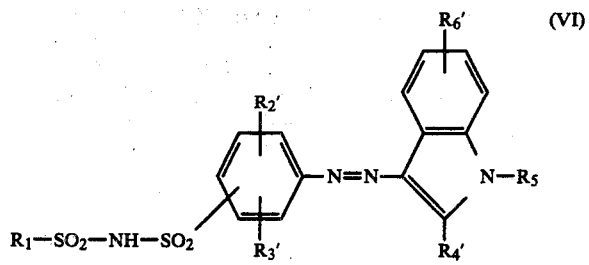

wherein
R₁, R₄', R₅ and R₆' have the abovementioned meaning,
R₂' represents hydrogen, chlorine, bromine, methyl, ethyl or trifluoromethyl,
R₃' represents hydrogen, chlorine, bromine, methyl, ethyl or trifluoromethyl and the disulphimide group is in the o-, m- or p-position relative to the azo bridge,
in particular those which in the form of the free acid correspond to the general formula

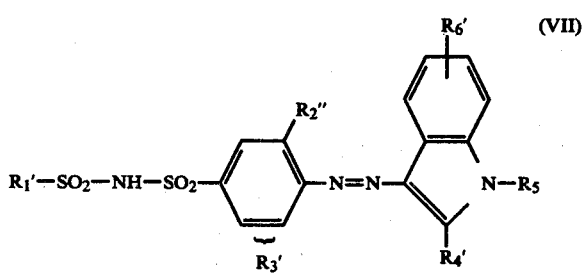

wherein
R₃', R₄', R₅ and R₆' have the abovementioned meaning,
R₁' represents alkyl with 1–4 C atoms or phenyl which is optionally substituted by C₁-C₄-alkyl, C₁—C₄— alkoxy or halogen and
R₂" represents chlorine, bromine, methyl, ethyl or trifluoromethyl.

Particularly preferred dyestuffs are those which in the form of the free acid correspond to the general formula

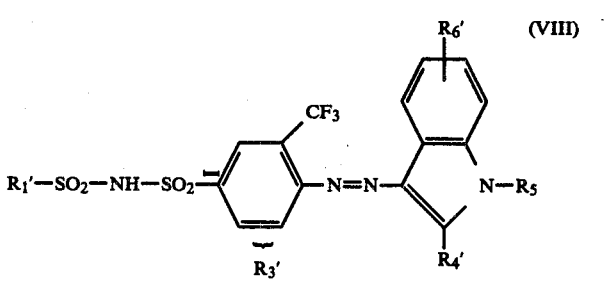

wherein
R₁', R₃', R₄', R₅ and R₆' have the abovementioned meaning.
Further preferred dyestuffs are those which in the form of the free acid correspond to the general formula

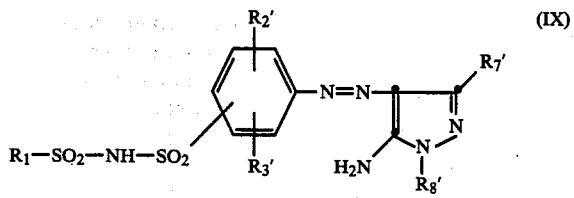

wherein
$R_1$, $R_2'$ and $R_3'$ have the abovementioned meaning,
$R_7'$ represents methyl and
$R_8'$ represents alkyl with 1-4 C atoms or aryl and the disulphimide group is in the o-, m- or p-position relative to the azo bridge, and especially those which in the form of the free acid correspond to the general formula

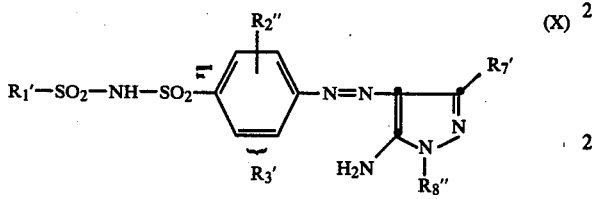

wherein
$R_1'$, $R_2''$, $R_3'$ and $R_7'$ have the abovementioned meaning and
$R_8''$ represents phenyl which is optionally substituted by halogen, $C_1$-$C_4$-alkyl or trifluoromethyl.

Further preferred dyestuffs are those which in the form of the free acid correspond to the general formula

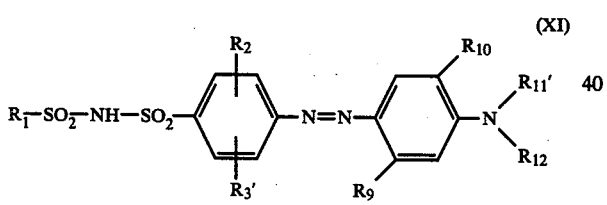

wherein
$R_1$, $R_2$, $R_3$, $R_9$, $R_{10}$ and $R_{12}$ have the abovementioned meaning and
$R_{11}'$ represents alkyl with 1-4 C atoms, especially those which in the form of the free acid correspond to the general formula

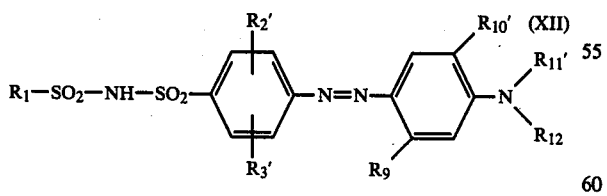

wherein
$R_1$, $R_2'$, $R_3'$, $R_9$, $R_{11}'$ and $R_{12}$ have the abovementioned meaning and
$R_{10}'$ represents hydrogen, chlorine, bromine, alkyl with 1-4 C atoms or alkoxy with 1-4 C atoms, especially those which in the form of the free acid correspond to the general formula

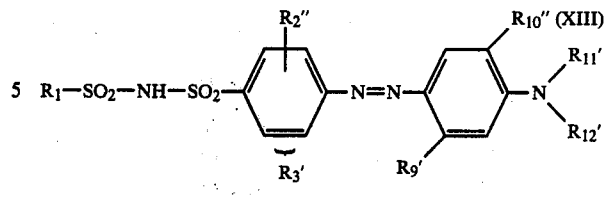

wherein
$R_1$, $R_2''$, $R_3'$ and $R_{11}'$ have the abovementioned meaning and
$R_9'$ represents hydrogen, chlorine, bromine, methyl, ethyl, methoxy, ethoxy or acylamino,
$R_{10}''$ represents hydrogen, chlorine, bromine, methyl or ethyl and
$R_{12}'$ represents hydrogen or $C_1$-$C_4$-alkyl, and very particularly those which in the form of the free acid correspond to the general formula

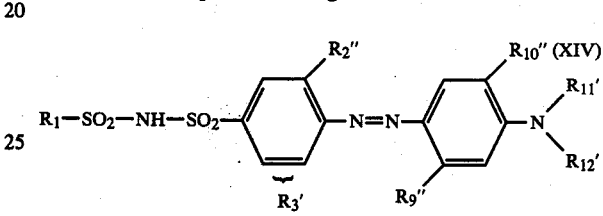

wherein
$R_1'$, $R_2''$, $R_3'$, $R_{10}''$, $R_{11}'$ and $R_{12}'$ have the abovementioned meaning and
$R_9''$ represents hydrogen, methyl, ethyl, methoxy, ethoxy, $C_1$-$C_4$-alkoxycarbonylamino, $C_1$-$C_4$-alkylcarbonylamino or benzoylamino which is optionally substituted by halogen, nitro, $C_1$-$C_4$-alkyl, trifluoromethyl or $C_1$-$C_4$-alkoxy.

The new monoazo dyestuffs (I) are prepared by diazotising an amine of the formula

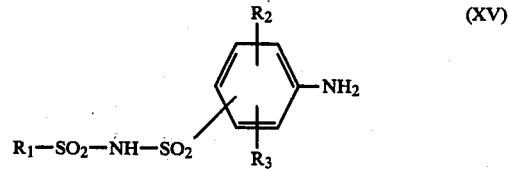

wherein
$R_1$, $R_2$ and $R_3$ have the abovementioned meaning and coupling with a coupling component of the formula (II), (III) or (IV).

The amines of the formula XV are prepared according to known processes, for example by reaction of a sulphonamide of the formula

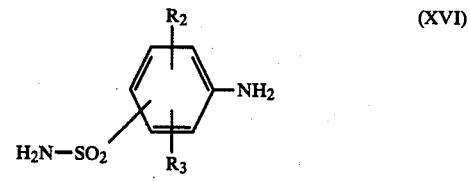

with a sulphochloride of the formula $R_1$—$SO_2$—Cl in an aqueous or organic-aqueous medium. Depending on the nature of the substituents $R_2$ and $R_3$, it can also be necessary or desirable to react sulphonamides of the formulae

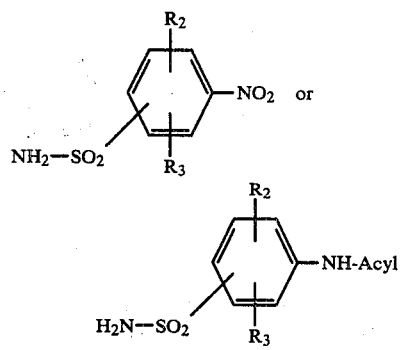

(XVII)

(XVIII)

with a sulphochloride of the formula $R_1SO_2Cl$ and subsequently to convert the nitro group by reduction, or the acylamino group by saponification, into an amino group.

The following may be mentioned as examples of suitable amines of the formula (XV): (3-amino-4-chloro-benzenesulphonyl)-methanesulphonamide, (3-amino-4-chloro-benzenesulphonyl)-butanesulphonamide, (3-amino-4-chloro-benzenesulphonyl)-o-toluenesulphonamide, (3-amino-4-chloro-benzenesulphonyl)-benzenesulphonamide, (3-amino-6-chloro-benzenesulphonyl)-benzenesulphonamide, (3-amino-6-chloro-benzenesulphonyl)-p-toluenesulphonamide, (3-amino-6-chloro-benzenesulphonyl)-o-toluenesulphonamide, (2-amino-benzenesulphonyl)-benzenesulphonamide, (2-amino-benzenesulphonyl)-p-toluenesulphonamide, (2-amino-benzenesulphonyl)-o-toluenesulphonamide, (2-amino-benzenesulphonyl)-methanesulphonamide, (2-amino-benzenesulphonyl)-butanesulphonamide, (3-amino-6-methyl-benzenesulphonyl)-benzenesulphonamide, (3-amino-6-methyl-benzenesulphonyl)-butanesulphonamide, (3-amino-6-methyl-benzenesulphonyl)-methanesulphonamide, (3-amino-6-methyl-benzenesulphonyl)-p-toluenesulphonamide, (3-amino-6-methyl-benzenesulphonyl)-o-toluenesulphonamide, (3-amino-4-methyl-benzenesulphonyl)-benzenesulphonamide, (3-amino-4-methyl-benzenesulphonyl)-p-toluenesulphonamide, (3-amino-4-methyl-benzenesulphonyl)-o-toluenesulphonamide, (3-amino-4-methyl-benzenesulphonyl)-methanesulphonamide, (3-amino-4-methoxy-benzenesulphonyl)-benzenesulphonamide, (3-amino-4-methoxy-benzenesulphonyl)-p-toluenesulphonamide, (3-amino-4-methoxy-benzenesulphonyl)-methanesulphonamide, (3-amino-4-methoxy-benzenesulphonyl)-butanesulphonamide, (3-amino-6-methoxy-benzenesulphonyl)-benzenesulphonamide, (3-amino-6-methoxy-benzenesulphonyl)-p-toluenesulphonamide, (3-amino-6-methoxy-benzenesulphonyl)-methanesulphonamide, (3-amino-6-methoxy-benzenesulphonyl)-butanesulphonamide, (3-amino-6-ethyl-benzenesulphonyl)-benzenesulphonamide, (3-amino-6-ethyl-benzenesulphonyl)-p-toluenesulphonamide, (3-amino-6-ethyl-benzenesulphonyl)-methanesulphonamide, (3-amino-4-ethyl-benzenesulphonyl)-benzenesulphonamide, (3-amino-6-ethoxy-benzenesulphonyl)-benzenesulphonamide, (3-amino-6-ethoxy-benzenesulphonyl)-p-toluenesulphonamide, (4-amino-benzenesulphonyl)-p-toluenesulphonamide, (4-amino-benzenesulphonyl)-o-toluenesulphonamide, (4-amino-benzenesulphonyl)-methanesulphonamide, (4-amino-benzenesulphonyl)-butanesulphonamide, (3-amino-4-bromo-benzenesulphonyl)-benzenesulphonamide, (3-amino-4-bromo-benzenesulphonyl)-p-toluenesulphonamide, (3-amino-4-bromo-benzenesulphonyl)-o-toluenesulphonamide, (3-amino-4-bromo-benzenesulphonyl)-methanesulphonamide, (3-amino-4-bromo-benzenesulphonyl)-butanesulphonamide, (2-amino-3-chloro-4-methyl-benzenesulphonyl)-benzenesulphonamide, (2-amino-3-chloro-4-methoxy-benzenesulphonyl)-benzenesulphonamide, (3-amino-4-chloro-5-methyl-benzenesulphonyl)-benzenesulphonamide, (3-amino-5-chloro-6-methyl-benzenesulphonyl)-benzenesulphonamide, (3-amino-5-chloro-6-methyl-benzenesulphonyl)-methanesulphonamide, (3-amino-benzenesulphonyl)-1-naphthylsulphonamide, (4-amino-benzenesulphonyl)-2-naphthylsulphonamide, (3-amino-benzenesulphonyl)-N,N-dimethylaminosulphonamide, (4-amino-benzenesulphonyl)-N,N-diethylaminosulphonamide, (3-amino-benzenesulphonyl)-N,N-dibutylaminosulphonamide, (3-amino-4-trifluoromethyl-benzenesulphonyl)-methanesulphonamide, (3-amino-4-trifluoromethyl-benzenesulphonyl)-p-toluenesulphonamide, (3-amino-4-trifluoromethyl-benzenesulphonyl)-benzenesulphonamide, (3-amino-benzenesulphonyl)-o-toluenesulphonamide, (3-amino-4-chloro-benzenesulphonyl)-p-toluenesulphonamide, (3-amino-benzenesulphonyl)-benzenesulphonamide, (3-amino-4-chloro-benzenesulphonyl)-benzenesulphonamide, (3-amino-benzenesulphonyl)-methanesulphonamide, (3-amino-benzenesulphonyl)-propanesulphonamide, (3-amino-benzenesulphonyl)-butanesulphonamide, (3-amino-benzenesulphonyl)-p-toluenesulphonamide, (4-amino-3-trifluoromethyl-benzenesulphonyl)-benzenesulphonamide, (4-amino-3-trifluoromethyl-benzenesulphonyl)-methanesulphonamide, (4-amino-3-trifluoromethyl-benzenesulphonyl)-butanesulphonamide, (4-amino-3-trifluoromethyl-benzenesulphonyl)-p-toluenesulphonamide, (4-amino-3-trifluoromethyl-benzenesulphonyl)-o-toluenesulphonamide, (4-amino-3-trifluoromethyl-benzenesulphonyl)-2-naphthylsulphonamide, (4-amino-3-chloro-benzenesulphonyl)-benzenesulphonamide, (4-amino-3-chloro-benzenesulphonyl)-p-toluenesulphonamide, (4-amino-3-chloro-benzenesulphonyl)-methanesulphonamide, (4-amino-3-chloro-benzenesulphonyl)-dimethylaminosulphonamide, (4-amino-3-bromo-benzenesulphonyl)-benzenesulphonamide, (4-amino-3-bromo-benzenesulphonyl)-methanesulphonamide, (4-amino-3-bromo-benzenesulphonyl)-p-toluenesulphonamide, (4-amino-3-methyl-benzenesulphonyl)-benzenesulphonamide, (4-amino-3-methyl-benzenesulphonyl)-methanesulphonamide, (4-amino-3-methyl-benzenesulphonyl)-o-toluenesulphonamide, (4-amino-3-methyl-benzenesulphonyl)-p-toluenesulphonamide, (4-amino-2,5-dichloro-benzenesulphonyl)-benzenesulphonamide, (4-amino-2,5-dichloro-benzenesulphonyl)-methanesulphonamide, (4-amino-2,5-dichloro-benzenesulphonyl)-propanesulphonamide, (4-amino-2,5-dichloro-benzenesulphonyl)-p-toluenesulphonamide, (4-amino-2,5-dichloro-benzenesulphonyl)-o-toluenesulphonamide, (4-amino-2,5-dichloro-benzenesulphonyl)-butanesulphonamide, (4-amino-2,5-dichloro-benzenesulphonyl)-dimethylaminosulphonamide, (4-amino-3,5-dichloro-benzenesulphonyl)-benzenesulphonamide, (4-amino-3,5-dichloro-benzenesulphonyl)-p-toluenesulphonamide, (4-amino-3,5-dichloro-benzenesulphonyl)-methanesulphonamide, (4-amino-2-chloro-5-trifluoromethyl-benzenesulphonyl)-benzenesulphonamide, (4-amino-2-chloro-5-trifluoromethyl-benzenesulphonyl)-methanesulphonamide, (4-amino-2-chloro-5-trifluoromethyl-benzenesulphonyl)-butanesulphonamide, (4-amino-2-chloro-5-trifluoromethyl-benzenesulphonyl)-p-toluenesulphonamide, (4-amino-2-chloro-5-trifluoromethyl-benzenesulphonyl)-o-toluenesulphonamide, (4-amino-2-chloro-5-trifluoromethyl-benzenesulphonyl)-2-naphthylsulphonamide, (4-amino-3-methyl-benzenesulphonyl)-methanesulphonamide, (4-amino-3-methyl-benzenesulphonyl)-ethanesulphonamide, (4-amino-3-methyl-benzenesulphonyl)-butanesulphonamide, (4-amino-3-methyl-benzenesulphonyl)-benzenesulphonamide, (4-amino-3-methyl-benzenesulphonyl)-p-toluenesulphonamide, (4-amino-3-methyl-benzenesulphonyl)-o-toluenesulphonamide, (4-amino-2-trifluoromethyl-5-chlorobenzenesulphonyl)-benzenesulphonamide, (4-amino-2-trifluoromethyl-5-chloro-benzenesulphonyl)-p-toluenesulphonamide, (4-amino-2-trifluoromethyl-5-chloro-benzenesulphonyl)-o-toluenesulphonamide, (4-amino-2-trifluoromethyl-5-chloro-benzenesulphonyl)-2-naphthylsulphonamide, (4-amino-2-trifluoromethyl-5-bromo-benzenesulphonyl)-benzenesulphonamide, (4-amino-2-trifluoromethyl-5-bromo-benzenesulphonyl)-methanesulphonamide, (4-amino-2-trifluoromethyl-5-bromo-benzenesulphonyl)-butanesulphonamide, (4-amino-2-trifluoromethyl-5-bromo-benzenesulphonyl)-o-toluenesulphonamide, (4-amino-2-trifluoromethylbenzenesulphonyl)-methanesulphonamide, (4-amino-2-trifluoromethyl-benzenesulphonyl)-butanesulphonamide, (4-amino-2-trifluoromethyl-benzenesulphonyl)-benzenesulphonamide, (4-amino-2-trifluoromethyl-benzenesulphonyl)-p-toluenesulphonamide, (4-amino-2-methyl-5-chloro-benzenesulphonyl)-benzenesulphonamide, (4-amino-2-methyl-5-chloro-benzenesulphonyl)-p-toluenesulphonamide, (4-amino-2-methyl-5-chloro-benzenesulphonyl)-o-toluenesulphonamide, (4-amino-2-methyl-5-trifluoromethyl-benzensulphonyl)-methanesulphonamide, (4-amino-2-methyl-5-trifluoromethyl-benzenesulphonyl)-benzenesulphonamide, (4-amino-2,5-dibromo-benzenesulphonyl)-benzenesulphonamide, (4-amino-2,5-dibromo-benzenesulphonyl)-p-toluenesulphonamide, (4-amino-2,5-dibromo-benzenesulphonyl)-o-toluenesulphonamide, (4-amino-2,5-dibromo-benzenesulphonyl)-2-naphthylsulphonamide, (4-amino-2,5-dibromo-benzenesulphonyl)-dimethylaminosulphonamide, (4-amino-2,5-dimethyl-benzenesulphonyl)-benzenesulphonamide, (4-amino-2,5-dimethyl-benzenesulphonyl)-methanesulphonamide, (4-amino-2,5-dimethyl-benzenesulphonyl)-butanesulphonamide, (4-amino-2,5-dimethyl-benzenesulphonyl)-p-toluenesulphonamide and (4-amino-2,5-dimethyl-benzenesulphonyl)-o-toluenesulphonamide.

Examples of suitable coupling components of the formula (II) are: 2-methyl-indole, 2-phenyl-indole, 1-methyl-2-phenyl-indole, 1,2-dimethyl-indole, 2-β-naphthyl-indole, 2-p-diphenyl-indole, 2,5-dimethyl-indole, 2,4-dimethyl-7-methoxy-indole, 2-phenyl-5-ethoxy-indole, 2-methyl-5-ethoxy-indole, 2-methyl-5-chloro-indole, 2-methyl-6-chloro-indole, 2-methyl-5-nitro-indole, 2-methyl-5-cyano-indole, 2-methyl-7-chloro-indole, 2-methyl-5-fluoro-indole, 2-methyl-5-bromo-indole and 2-methyl-5,7-dichloro-indole, and also the indole-sulphonic acid described in German Patent Specification 137,117 and other indole-sulphonic acids prepared, analogously to the process described in German Patent Specification No. 137,117, from 2-alkyl- or 2-aryl-indoles, for example 2-methyl-indole-sulphonic acid, 1,2-dimethyl-indole-sulphonic acid, 2,5-dimethyl-indole-sulphonic acid, 1-ethyl-2-methyl-indole-sulphonic acid, 1,2,5-trimethyl-indole-sulphonic acid, 1-ethyl-2,5-dimethyl-indole-sulphonic acid, 2-phenyl-indole-sulphonic acid and 1-methyl-2-phenyl-indole-sulphonic acid. It is probable that at least in the case of the indoles which are unsubstituted in the carbocyclic part, the sulpho group enters the 5-position in the sulphonation by the process described in German Patent Specification No. 137,117.

Examples of suitable coupling components of the formula (III) are: 1-isopropyl-3-methyl-5-aminopyrazole, 1-(β-hydroxyethyl)-3-methyl-5-aminopyrazole, 1,3-dimethyl-5-aminopyrazole, 1-methyl-3-phenyl-5-aminopyrazole, 1-ethyl-3-methyl-5-aminopyrazole, 1-(2-furfuryl)-3-methyl-5-aminopyrazole, 1-(β-cyanoethyl)-3-methyl-5-aminopyrazole, 1-(α-phenylethyl)-3-methyl-5-aminopyrazole, 1-isobutyl-3-methyl-5-aminopyrazole, 1-(1,2-dimethyl-n-propyl)-3-methyl-5-aminopyrazole, 1-benzyl-3-methyl-5-aminopyrazole, 1-phenyl-3-ethyl-5-aminopyrazole, 1-(3-methoxyphenyl)-3-methyl-5-aminopyrazole, 1-(2-methylphenyl)-3-methyl-5-aminopyrazole, 1-(4-aminophenyl)-3-methyl-5-aminopyrazole, 1-(2-phenyl-propyl)-5-aminopyrazole, 1-(3-methylphenyl)-3-methyl-5-aminopyrazole, (1-(4-ethoxyphenyl)-3-methyl-5-aminopyrazole, 1-(2-methoxy-5-methylphenyl)-3-methyl-5-aminopyrazole, 1-cyclohexyl-3-methyl-5-aminopyrazole, 1-(4-methylphenyl)-3-methyl-5-aminopyrazole, 1-(4-methoxyphenyl)-3-methyl-5-aminopyrazole, 1-(2,6-dimethylphenyl)-3-methyl-5-aminopyrazole, 1-(2-chlorophenyl)-3-methyl-5-aminopyrazole, 1-(3-chlorophenyl)-3-methyl-5-aminopyrazole, 1-(4-chlorophenyl)-3-methyl-5-aminopyrazole, 1-(3-nitrophenyl)-3-methyl-5-aminopyrazole, 1-(4-nitrophenyl)-3-methyl-5-aminopyrazole, 1-(2-trifluoromethyl-phenyl)-3-methyl-5-aminopyrazole and 1-(2,5-dichlorophenyl)-3-methyl-5-aminopyrazole.

Examples of suitable coupling components of the formula (IV) are: N,N-dimethylaniline, N,N-diethylaniline, N-methyl-N-n-butylaniline, N,N-diethyl-m-toluidine, N,N-diethylamino-3-chlorobenzene, N,N-diethyl-N'-formyl-m-phenylenediamine, N,N-diethyl-N'-acetyl-m-phenylenediamine, N,N-diethyl-N'-propionyl-m-phenylenediamine, N,N-diethylamino-3-methoxybenzene, 1-N,N-diethylamino-2,5-dimethoxybenzene, 1-N,N-diethylamino-2,5-diethoxybenzene, 1-N,N-diethylamino-2-methoxy-3-acetylaminobenzene, N-ethyl-N-β-chloroethylaniline, N,N-bis-(β-chloroethyl)-aniline, N-(β-chloroethyl)-N-butyl-aniline, N-(β-chloroethyl)-N-ethyl-m-toluidine, N,N-bis-(β-chloroethyl)-m-toluidine, N-methyl-N-β-hydroxyethyl-aniline, N-ethyl-N-β-hydroxyethyl-aniline, N,N-bis-(β-hydroxyethyl)-aniline, N-butyl-N-(β-hydroxyethyl)-aniline, N,N-bis-(β,γ-dihydroxypropyl)-aniline, N-ethyl-N-benzyl-aniline, N-ethyl-N-benzyl-m-toluidine, N-ethyl-N-β-hydroxyethyl-m-toluidine, N,N-bis-(β-hydroxyethyl)-m-toluidine, 1-(N-ethyl-N-β-hydroxyethyl)-amino-2-methoxy-5-methylbenzene, N-ethyl-N-β-hydroxyethyl-N'-acetyl-m-phenylenediamine, N,N-bis-(β-hydroxyethyl)-N'-acetyl-m-phenylenediamine, 1-N,N-bis-(β-hydroxyethyl)-amino-2-methoxy-5-acetylaminobenzene, 1-N,N-bis-(β-hydroxyethyl)-amino-2-ethoxy-5-acetylaminobenzene, 1-N,N-bis-(β-hydroxyethyl)-amino-2-methoxy-5-propionylaminobenzene, N-ethyl-N-β-acetoxyethylaniline, N,N-bis-(β-acetoxyethyl)-aniline, N-butyl-N-β-acetoxyethyl-aniline, N-ethyl-N-β-acetoxyethyl-m-toluidine, N,N-bis-(β-acetoxyethyl)-m-toluidine, 1-N-ethyl-N-β-acetoxyethylamino-2-methoxy-5-methylbenzene, N-ethyl-N-β-acetoxyethyl- N'-acetyl-m-phenylenediamine, N,N-bis-(β-acetoxyethyl)-N'-acetyl-m-phenylenediamine, 1-N,N-bis-(β-acetoxyethyl)-amino-2-methoxy-5-acetylamino-benzene, 1-N,N-bis-(β-acetoxyethyl)-amino-2-ethoxy-5-acetylamino-benzene, 1-N,N-(β-acetoxyethyl)-amino-2-methoxy-5-propionylaminobenzene, N,N-bis-(β-ethoxycarbonyloxyethyl)-aniline, N,N-bis-(β-methoxycarbonyloxyethyl)-aniline, N,N-bis-(β-ethoxycarbonyloxyethyl)-m-toluidine, N,N-bis-(β-methoxycarbonyloxyethyl)-m-toluidine, N,N-bis-(β-ethoxycarbonyloxyethyl)-N'-acetyl-m-phenylenediamine, N,N-bis-(β-methoxycarbonyloxyethyl)-N'-acetyl-m-phenylenediamine, 1-N,N-bis-(β-ethoxycarbonyloxyethyl)-amino-2-methoxy-5-acetylaminobenzene, 1-N,N-bis-(β-methoxycarbonyloxyethyl)-amino-2-methoxy-5-acetylamino-benzene, 1-N,N-bis-(β-ethoxycarbonyloxyethyl)-amino-2-ethoxy-5-acetylaminobenzene, 1-N,N-bis-(β-methoxycarbonyloxyethyl)-amino-2-ethoxy-5-acetylaminobenzene, N,N-bis-(β-carbomethoxy-ethyl)-N'-acetyl-m-phenylenediamine, N-methyl-N-β-cyanoethyl-aniline, N,N-bis-(β-cyanoethyl)-aniline, N-ethyl-N-β-cyanoethyl-m-toluidine, N-ethyl-N-β-cyanoethyl-N'-acetylamino-m-phenylenediamine, N-β-hydroxyethyl-N-β-cyanoethylaniline, N-β-acetoxyethyl-N-β-cyanoethyl-m-toluidine, N-β-methoxycarbonyloxyethyl-N-β-cyanoethyl-N'-acetyl-m-phenylenediamine, N,N-bis-(β-cyanoethyl)-N'-benzoyl-m-phenylenediamine, N-β-hydroxyethyl-N-β-cyanoethyl-N'-phenacetyl-m-phenylenediamine, N,N-diethyl-N'-phenoxyacetyl-m-phenylenediamine, N-ethyl-N-β-cyanoethyl-N'-phenoxyacetyl-m-phenylenediamine, N,N-bis-(β-cyanoethyl)-N'-p-chlorobenzoyl-m-phenylenediamine, N-ethyl-N-β-phenylethyl-aniline, N-ethyl-N-β-phenylethyl-m-toluidine, N-butyl-N-β-phenylethyl-aniline, N-butyl-N-β-phenylethyl-m-toluidine, N-β-cyanoethyl-N-β-phenylethyl-aniline, N-β-cyanoethyl-N-β-phenylethyl-m-toluidine, N-ethyl-N-β-methoxyethyl-aniline, N-ethyl-N-β-methoxyethyl-m-toluidine, 1-N,N-diethylamino-2-methoxy-5-methanesulphonylaminobenzene, 1-N,N-bis-(β-hydroxyethyl)-amino-2-ethoxy-5-benzenesulphonylamino-benzene, 1-N-ethyl-N-β-cyanoethyl)-amino-2-methoxy-5-formylamino-benzene, 1-(N-methyl-N-ethyl)-amino-2-ethoxy-5-benzenesulphonylaminobenzene, 1-N,N-dipropylamino-2-methoxy-5-ethanesulphonylaminobenzene, N,N-diethylamino-N'-acryloyl-m-phenylenediamine, 1-N,N-diethylamino-2-methoxy-5-methacryloylamino-benzene, 1-(N-β-acetoxyethyl-N-ethyl)-amino-2-ethoxy-5-(2'-thenoylamino)-benzene, 1-(N-ethyl-N-β-cyanoethyl)-amino-2-methoxy-5-cyclohexylcarbonylaminobenzene, N,N-diethylamino-N'-ethoxycarbonyl-m-phenylenediamine, 1-(N-β-acetoxyethyl-N-ethyl)-amino-2-methoxy-5-methoxycarbonylamino-benzene, 1-(N-β-cyanoethyl-N-ethyl)-amino-2-ethoxy-5-propoxycarbonylamino-benzene and 1-(N-β-hydroxyethyl-N-ethyl)-amino-2-methoxy-5-ethoxycarbonylamino-benzene.

The dyestuffs according to the invention are suitable for dyeing natural and synthetic fibre materials, for example of wool, silk and polyamide, and especially for dyeing polyamide fibres in level yellow, red and ruby shades of good dyeing yield and good level of fastness.

By polyamide fibres there are in particular understood those of synthetic polyamides such as ε-polycaprolactam or condensation products of adipic acid and hexamethylenediamine. The dyestuffs can be employed either in the form of the free acids (—SO₂-NH-SO₂—) or in the form of their salts, especially of the alkali metal salts, especially of the sodium salts or of the ammonium salts, but also in the form of the lithium salts.

The diazotisation of the amines of the formula (XV) is carried out according to known methods, preferably in aqueous mineral acid solution, using sodium nitrite. The coupling of the diazonium compounds of the amines of the formula (XV) with the coupling components of the formulae (II), (III) and (IV) can be carried out according to known processes, for example in a neutral to strongly acid pH range, but preferably in a weakly acid pH range, in an aqueous or organic-aqueous medium.

The more sparingly soluble dyestuffs (I) can be rendered readily water-soluble by mixing them with salts of strong bases and weak acids, for example trisodium phosphate, disodium hydrogen phosphate, sodium tetraborate, sodium metaphosphate, sodium metasilicate or sodium carbonate.

The new dyestuffs of the formula (I) can be isolated in the form of the free acid or as alkali metal salts or ammonium salts. Examples of suitable alkali metal salts, in which the hydrogen atom of the —SO₂-NH-SO₂— group is thus replaced by an alkali metal cation, are the sodium, potassium or lithium salts.

EXAMPLE 1

38 g of (4-amino-3-trifluoromethyl-benzenesulphonyl)benzenesulphonamide are dissolved in 800 ml of water by means of a little sodium hydroxide solution, at pH 9 and 70° C.; 7.0 g of sodium nitrite are added. This solution is added, over the course of 30 minutes, to 30 ml of (37% strength) hydrochloric acid at 0°–5° C. and the mixture is stirred for 30 minutes at 0°–5° C. A solution of 18.7 g of N-ethyl-N-β-cyanoethyl-m-toluidine in 100 ml of 10% strength hydrochloric acid is added to the colourless suspension of the diazonium compound and the coupling which takes place immediately is completed by addition of sodium acetate. After salting out, the dyestuff of the formula

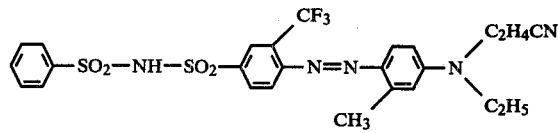

is filtered off and dried. The dyestuff dyes polyamide, from a weakly acid or neutral bath, in yellowish-tinged orange shades of a good level of fastness.

Dyeing example 0.1 g of the dyestuff of Example 1 is dissolved in 100 ml of hot water, 5 ml of 10% strength ammonium acetate solution are added and the mixture is diluted to a volume of 500 ml with water. 10 g of polyamide fibres are introduced into the dyebath, the latter is brought to the boil over the course of 20 minutes, 4 ml of 10% strength acetic acid are added and the bath is kept at the boil for one hour. The fibres are then rinsed, and dried at 70°–80° C.

EXAMPLE 2

If the procedure in Example 1 is followed, using 13.1 g of 2-methyl-indole, dissolved in 150 ml of glacial acetic acid, for the coupling reaction in place of diethyl-m-toluidine, a dyestuff is obtained which in the form of the free acid corresponds to the formula

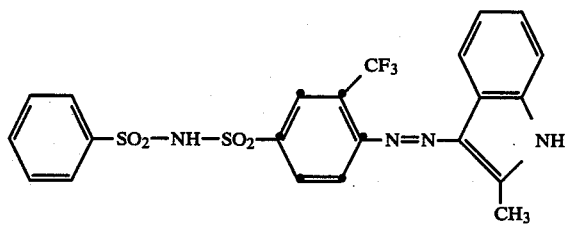

and dyes synthetic polyamides in yellow shades of excellent fastness properties.

EXAMPLE 3

If the procedure in Example 1 is followed, using 19.3 g of 2-phenyl-indole, dissolved in 150 ml of glacial acetic acid, for the coupling reaction in place of diethyl-m-toluidine, a dyestuff is obtained which in the form of the free acid corresponds to the formula

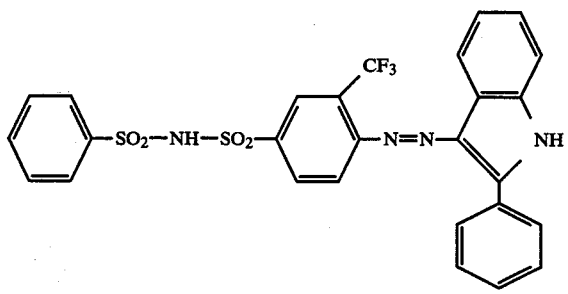

and dyes synthetic polyamides in reddish-tinged yellow shades of excellent fastness properties.

EXAMPLE 4

The procedure in Example 1 is followed, but 17.3 g of 1-phenyl-3-methyl-5-aminopyrazole hydrochloride in 150 ml of water are used for the coupling reaction instead of diethyl-m-toluidine, and the mixture is buffered to pH 4–5 with sodium acetate. After completion of the coupling reaction, the dyestuff, which in the form of the free acid corresponds to the formula

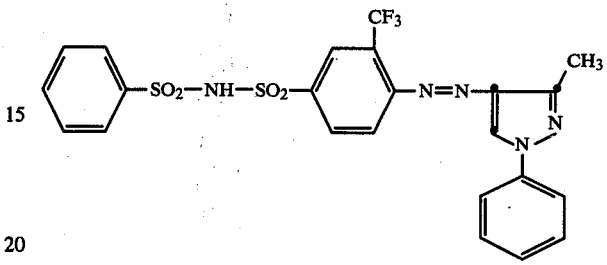

is filtered off and dried. It dye polyamide fibres and polyamide fabrics, from a weakly acid of neutral bath, in greenish-tinged yellow shades of a good level of fastness.

If the procedure described in Examples 1 to 4 is followed and the diazo components employed are the compounds listed in column I, and the coupling components employed are the compounds listed in column II of the table which follows, valuable water-soluble dyestuffs are again obtained, which dye polyamide from a weakly acid or neutral bath. Aniline derivatives used as coupling components here give orange, red and ruby shades, indole derivatives give yellow shades and derivatives of 5-aminopyrazole give greenish-tinged yellow shades.

| Example | I | II |
| --- | --- | --- |
| 5 | (4-Amino-3-trifluoromethyl-benzenesulphonyl)-benzenesulphonamide | N,N-dimethyl-aniline |
| 6 | " | N,N-di-n-propylaniline |
| 7 | " | N-ethyl-N-β-cyanoethylaniline |
| 8 | " | N,N-diethylaniline |
| 9 | " | N-ethyl-N-benzylaniline |
| 10 | " | N-ethyl-N-β-phenylethyl-3-methylaniline |
| 11 | " | N-β-methoxyethyl-N-ethyl-3-methylaniline |
| 12 | " | N-ethyl-N-β-phenylethylaniline |
| 13 | " | N,N-diethyl-3-acetylaminoaniline |
| 14 | " | N-ethyl-N-benzyl-3-methylaniline |
| 15 | " | N-ethyl-N-β-hydroxyethylaniline |
| 16 | " | N-ethyl-N-β-hydroxyethyl-3-methylaniline |
| 17 | " | N-ethyl-N-β-methoxyethylaniline |
| 18 | " | N,N-di-n-butylaniline |
| 19 | " | 1-methyl-2-phenyl-indole |
| 20 | " | 1,2-dimethyl-indole |
| 21 | " | 2-β-naphthylindole |
| 22 | " | 2-p-diphenyl-indole |
| 23 | " | 1,2,5-trimethyl-indole |
| 24 | " | 1-ethyl-2-methyl-indole |
| 25 | " | 2-methyl-6-chloro-indole |
| 26 | " | 2-methyl-7-chloro-indole |
| 27 | " | 2-methyl-5,7-dichloro-indole |
| 28 | " | 2-methyl-5-methoxy-indole |
| 29 | " | 2-methyl-5-bromo-indole |
| 30 | " | 2-methyl-5-fluoro-indole |
| 31 | " | 2-methyl-indole-sulphonic acid |
| 32 | " | 2-phenyl-indole-sulphonic acid |
| 33 | " | 1-methyl-2-phenyl-indole-sulphonic acid |
| 34 | (4-amino-3-trifluoromethyl-benzenesulphonyl)-p-toluenesulphonamide | N,N-diethyl-3-chloroaniline |
| 35 | " | N,N-di-n-butylaniline |
| 36 | " | N-β-cyanoethyl-3-chloroaniline |
| 37 | " | N-β-cyanoethyl-2-methoxy-5-methylaniline |

-continued

| Example | I | II |
|---|---|---|
| 38 | " | N,N-diethyl-3-acetylaminoaniline |
| 39 | " | N-ethyl-N-β-cyanoethyl-3-methylaniline |
| 40 | " | N-ethyl-N-β-cyanoethylaniline |
| 41 | " | N,N-diethylaniline |
| 42 | " | N-ethyl-N-β-phenylethylaniline |
| 43 | " | N-ethyl-N-β-phenylethyl-3-methylaniline |
| 44 | " | 2-methyl-indole |
| 45 | " | 2-phenyl-indole |
| 46 | " | 1-methyl-2-phenyl-indole |
| 47 | " | 2-methyl-indole-sulphonic acid |
| 48 | " | 2-phenyl-indole-sulphonic acid |
| 49 | " | 1-methyl-2-phenyl-indole-sulphonic acid |
| 50 | " | 1-ethyl-2-methyl-indole |
| 51 | (4-Amino-3-trifluoromethyl-benzenesulphonyl)-o-toluenesulphonamide | N-β-cyanoethyl-3-acetylaminoaniline |
| 52 | " | N-butyl-N-β-phenylethylaniline |
| 53 | " | N-butyl-N-β-phenylethyl-3-methylaniline |
| 54 | " | N-β-cyanoethyl-N-β-phenylethylaniline |
| 55 | " | N,N-di-β-acetoxyethyl-3-methylaniline |
| 56 | " | N,N-diethyl-3-chloroaniline |
| 57 | " | N,N-di-β-methoxyethylaniline |
| 58 | " | N-ethyl-N-β-propionoxyethylaniline |
| 59 | " | N-ethyl-N-β-methoxycarbonyloxyethylaniline |
| 60 | " | N-ethyl-N-β-methoxycarbonylethylaniline |
| 61 | " | N-ethyl-N-β-ethoxycarbonylethylaniline |
| 62 | " | N-ethyl-N-β-chloroethylaniline |
| 63 | " | 2-methyl-indole |
| 64 | " | 2-phenyl-indole |
| 65 | (4-Amino-3-trifluoromethyl-benzenesulphonyl)-methanesulphonamide | N-ethyl-N-β-hydroxyethylaniline |
| 66 | " | N-ethyl-N-β-hydroxyethyl-3-methylaniline |
| 67 | " | N,N-di-n-propyl-3-methylaniline |
| 68 | " | N-ethyl-N-benzyl-3-methylaniline |
| 69 | " | N-β-cyanoethyl-N-β-acetoxyethyl-3-methyl-aniline |
| 70 | " | N,N-diethyl-3-benzoylaminoaniline |
| 71 | " | N,N-diethyl-3-methylaniline |
| 72 | " | 2-methyl-indole-sulphonic acid |
| 73 | " | 2-phenyl-indole-sulphonic acid |
| 74 | " | 1-methyl-2-phenyl-indole-sulphonic acid |
| 75 | " | 2-methyl-indole |
| 76 | " | 2-phenyl-indole |
| 77 | " | 1-methyl-2-phenyl-indole |
| 78 | " | 1,2-dimethyl-indole |
| 79 | " | 2-methyl-5-methoxy-indole |
| 80 | " | 2-methyl-5-bromo-indole |
| 81 | " | 2-methyl-5-fluoro-indole |
| 82 | " | 1-phenyl-3-methyl-5-aminopyrazole |
| 83 | " | 1-(2-chlorophenyl)-3-methyl-5-aminopyrazole |
| 84 | " | 1-(4-tolyl)-3-methyl-5-aminopyrazole |
| 85 | " | 1-(3-chlorophenyl)-3-methyl-5-aminopyrazole |
| 86 | " | 1-(4-chlorophenyl)-3-methyl-5-aminopyrazole |
| 87 | (4-Amino-2-chloro-5-trifluoromethyl-benzenesulphonyl)-benzenesulphonamide | N,N-diethylaniline |
| 88 | " | N,N-diethyl-3-methylaniline |
| 89 | " | N-ethyl-N-β-cyanoethylaniline |
| 90 | " | N,N-di-β-cyanoethyl-3-methylaniline |
| 91 | " | N-ethyl-N-β-phenylethyl-3-methylaniline |
| 92 | " | N,N-dipropyl-3-methylaniline |
| 93 | " | N-β-cyanoethyl-2-methoxy-5-methylaniline |
| 94 | " | N,N-diethyl-2-ethoxy-5-acetylaminoaniline |
| 95 | " | N,N-diethyl-3-benzoylaminoaniline |
| 96 | " | N-ethyl-2-chloro-aniline |
| 97 | " | 2-methyl-indole |
| 98 | " | |
| 99 | " | 2-phenyl-indole |
| 100 | " | 1-methyl-2-phenyl-indole |
| 101 | " | 2-methyl-5-methoxy-indole |
| 102 | " | 2-methyl-6-chloro-indole |
| 103 | " | 1-(2-trifluoromethylphenyl)-3-methyl-5-aminopyrazole |
| 104 | " | 1-phenyl-3-ethyl-5-aminopyrazole |
| 105 | " | 1-(3-chlorophenyl)-3-methyl-5-aminopyrazole |
| 106 | (4-Amino-2-chloro-5-trifluoromethyl-benzenesulphonyl)-butanesulphonamide | N,N-dimethyl-3-benzoylaminoaniline |
| 107 | " | N,N-diethyl-3-methoxyaniline |
| 108 | " | N-βcyanoethyl-3-acetylaminoaniline |
| 109 | " | N-ethyl-N-β-hydroxyethyl-3-methylaniline |
| 110 | " | N,N-di-β-methoxyethylaniline |
| 111 | " | N-β-cyanoethyl-N-benzyl-3-methylaniline |
| 112 | " | N-ethyl-N-β-hydroxyethyl-3-benzenesulphonyl- |

4,159,265

-continued

| Example | I | II |
|---|---|---|
| | | amino-aniline |
| 113 | " | 2-methyl-5-methoxy-indole |
| 114 | " | 2-methyl-6-chloro-indole |
| 115 | " | 1,2-dimethyl-indole |
| 116 | " | 1,2,5-trimethyl-indole |
| 117 | " | 2-methyl-indole |
| 118 | " | 2-phenyl-indole |
| 119 | " | 1-methyl-2-phenyl-indole |
| 120 | " | 2-methyl-indole-sulphonic acid |
| 121 | (4-Amino-2,5-dichloro-benzenesulphonyl)-benzenesulphonamide | N,N-di-β-hydroxyethyl-3-acetylaminoaniline |
| 122 | " | N-β-cyanoethyl-N-β-hydroxyethyl-3-methyl-aniline |
| 123 | " | N-β-cyanoethyl-N-β-phenylethyl-3-methyl-aniline |
| 124 | " | N-β-cyanoethyl-N-β-acetoxyethyl-3-methyl-aniline |
| 125 | " | N-β-cyanoethyl-2-methoxy-5-acetylamino-aniline |
| 126 | " | N,N-diethyl-2-ethoxy-5-(4-toluenesulphonyl)-amino-aniline |
| 127 | " | 2-methyl-indole |
| 128 | " | 2-phenyl-indole |
| 129 | " | 1-methyl-2-phenyl-indole |
| 130 | " | 2,5-dimethyl-indole |
| 131 | " | 2-methyl-indole-sulphonic acid |
| 132 | " | 2-phenyl-indole-sulphonic acid |
| 133 | " | 1-methyl-2-phenyl-indole-sulphonic acid |
| 134 | " | 1-β-cyanoethyl-3-methyl-5-aminopyrazole |
| 135 | " | 1-(4-chlorophenyl)-3-methyl-5-aminopyrazole |
| 136 | " | 1-(2,5-dichlorophenyl)-3-methyl-5-amino-pyrazole |
| 137 | " | 1-(2-chlorophenyl)-3-ethyl-5-aminopyrazole |
| 138 | " | 1-(4-tolyl)-3-methyl-5-aminopyrazole |
| 139 | (4-Amino-2,5-dichloro-benzenesulphonyl)-dimethylaminosulphonamide | N-ethyl-N-β-methoxyethyl-3-methylaniline |
| 140 | " | N,N-diethyl-3-methacryloylaminoaniline |
| 141 | " | N-cyanoethyl-N-β-acetoxyethyl-3-methyl-aniline |
| 142 | " | N,N-diethyl-3-methylaniline |
| 143 | " | N-β-cyanoethyl-N-benzyl-3-methylaniline |
| 144 | " | N,N-diethyl-3-acetylaminoaniline |
| 145 | " | N,N-diethyl-3-formylaminoaniline |
| 146 | " | 2-methyl-indole |
| 147 | " | 2-phenyl-indole |
| 148 | " | 1-methyl-2-phenyl-indole |
| 149 | " | 2-methyl-indole-sulphonic acid |
| 150 | " | 2-phenyl-indole-sulphonic acid |
| 151 | " | 1-cyclohexyl-3-methyl-5-aminopyrazole |
| 152 | " | 1-phenyl-3-methyl-5-aminopyrazole |
| 153 | " | 1-sec.butyl-3-methyl-5-aminopyrazole |
| 154 | " | 1-α,β-dimethylpropyl-3-methyl-5-amino-pyrazole |
| 155 | " | 1-benzyl-3-methyl-5-aminopyrazole |
| 156 | " | 1-(3-chlorophenyl)-3-ethyl-5-aminopyrazole |
| 157 | (4-Amino-3-chlorobenzene-sulphonyl)-benzenesulphonamide | N,N-diethyl-3-chloroaniline |
| 158 | " | N,N-di-β-hydroxyethyl-3-acetylaminoaniline |
| 159 | " | N-β-phenylethyl-2-methoxy-5-acetylaminoaniline |
| 160 | " | N,N-di-n-propyl-3-acetylaminoaniline |
| 161 | " | N-ethyl-2-ethoxy-5-acetylaminoaniline |
| 162 | (4-Amino-3-chloro-benzenesulphonyl)-benzenesulphonamide | N-β-cyanoethyl-N-β-phenylethyl-3-methylaniline |
| 163 | " | N-ethyl-N-β-cyanoethyl-3-methylaniline |
| 164 | " | N-ethyl-N-β-phenylethyl-3-methylaniline |
| 165 | " | N,N-di-n-propylaniline |
| 166 | " | N,N-diethyl-3-methylaniline |
| 167 | " | N,N-diethylaniline |
| 168 | " | 2-methyl-indole |
| 169 | " | 2-phenyl-indole |
| 170 | " | 1-methyl-2-phenyl-indole |
| 171 | " | 1,2-dimethyl-indole |
| 172 | " | 2-β-naphthyl-indole |
| 173 | " | 2-p-diphenylyl-indole |
| 174 | " | 1,2,5-trimethyl-indole |
| 175 | " | 1-ethyl-2-methyl-indole |
| 176 | " | 2-methyl-6-chloro-indole |
| 177 | " | 2-methyl-7-chloro-indole |
| 178 | " | 2-methyl-5,7-dichloro-indole |
| 179 | " | 1,2-dimethyl-indole-sulphonic acid |
| 180 | " | 2-methyl-indole-sulphonic acid |

4,159,265

-continued

| Example | I | II |
|---|---|---|
| 181 | " | 2-phenyl-indole-sulphonic acid |
| 182 | " | 1-methyl-2-phenyl-indole-sulphonic acid |
| 183 | " | 1-ethyl-2-phenyl-indole-sulphonic acid |
| 184 | " | 1,2,5-trimethyl-indole-sulphonic acid |
| 185 | " | 1-ethyl-2-methyl-indole-sulphonic acid |
| 186 | " | 1-(3-nitrophenyl)-3-methyl-5-aminopyrazole |
| 187 | " | 1-isopropyl-3-methyl-5-aminopyrazole |
| 188 | " | 1-$\beta$-hydroxyethyl-3-methyl-5-aminopyrazole |
| 189 | " | 1,3-dimethyl-5-aminopyrazole |
| 190 | " | 1-ethyl-3-methyl-5-aminopyrazole |
| 191 | " | 1-$\beta$-cyanoethyl-3-methyl-5-aminopyrazole |
| 192 | " | 1-cyclohexyl-3-methyl-5-aminopyrazole |
| 193 | " | 1-phenyl-3-methyl-5-aminopyrazole |
| 194 | " | 3-methyl-5-aminopyrazole |
| 195 | " | 1-($\alpha$-phenylethyl)-3-methyl-5-aminopyrazole |
| 196 | " | 1-(3-chlorophenyl)-3-methyl-5-aminopyrazole |
| 197 | " | 1-(2-chlorophenyl)-3-methyl-5-aminopyrazole |
| 198 | " | 1-(2-trifluoromethylphenyl)-3-methyl-5-aminopyrazole |
| 199 | (4-Amino-3-chloro-benzenesulphonyl)-p-toluenesulphonamide | N,N-diethyl-3-methylaniline |
| 200 | " | N-ethyl-N-$\beta$-phenylethyl-3-methylaniline |
| 201 | " | N,N-diethylaniline |
| 202 | " | N,N-dipropyl-3-methylaniline |
| 203 | " | N-ethyl-2,5-dimethylaniline |
| 204 | " | N,N-di-$\beta$-hydroxyethyl-3-benzoylaminoaniline |
| 205 | " | N-$\beta$-cyanoethyl-3-acetylaminoaniline |
| 206 | " | N-ethyl-N-$\beta$-ethoxycarbonyloxyethyl-3-methylaniline |
| 207 | " | N-$\beta$-hydroxyethyl-3-methoxy-5-methylaniline |
| 208 | " | N,N-di-$\beta$-ethoxyethyl-3-acetylaminoaniline |
| 209 | " | N-ethyl-N-$\beta$-methoxycarbonylethyl-3-methylaniline |
| 210 | " | N-ethyl-N-$\beta$-methoxycarbonyloxyethyl-3-acetylaminoaniline |
| 211 | " | N-ethyl-N-$\beta$-hydroxyethyl-3-methylaniline |
| 212 | " | N-ethyl-N-$\beta$-cyanoethyl-3-methylaniline |
| 213 | " | 2-methyl-indole-sulphonic acid |
| 214 | " | 2-phenyl-indole-sulphonic acid |
| 215 | " | 1-methyl-2-phenyl-indole-sulphonic acid |
| 216 | " | 2-methyl-indole |
| 217 | " | 2-phenyl-indole |
| 218 | " | 1-methyl-2-phenyl-indole |
| 219 | " | 1,2,5-trimethyl-indole |
| 220 | " | 1,2,5-trimethyl-indole-sulphonic acid |
| 221 | " | 1,5-dimethyl-2-phenyl-indole-sulphonic acid |
| 222 | " | 1-ethyl-2-methyl-indole |
| 223 | " | 1-ethyl-2-phenyl-indole |
| 224 | " | 2-methy-6-chloro-indole |
| 225 | " | 2-methyl-5-methoxy-idole |
| 226 | " | 1-n-butyl-2-methyl-indole |
| 227 | " | 2-methyl-7-chloro-indole |
| 228 | " | 2-methyl-5,7-dichloro-indole |
| 229 | " | 2-methyl-5-fluoro-indole |
| 230 | " | 1-phenyl-3-methyl-5-aminopyrazole |
| 231 | " | 1-(2-chlorophenyl)-3-methyl-5-aminopyrazole |
| 232 | " | 1-(2-trifluorophenyl)-3-methyl-5-aminopyrazole |
| 233 | " | 1-phenyl-3-ethyl-5-aminopyrazole |
| 234 | " | 1-(4-tolyl)-3-methyl-5-aminopyrazole |
| 235 | " | 1-cyclohexyl-methyl-5-aminopyrazole |
| 236 | " | 1-cyclopentyl-3-methyl-5-aminopyrazole |
| 237 | (4-Amino-3-bromo-benzenesulphonyl)-benzenesulphonamide | N,N-diethyl-3-methylaniline |
| 238 | " | N-ethyl-N-benzylaniline |
| 239 | " | 2-methyl-indole |
| 240 | " | 2-phenyl-indole-sulphonic acid |
| 241 | " | 1-(4-tolyl)-3-methyl-5-aminopyrazole |
| 242 | " | 1-cyclohexyl-3-methyl-5-aminopyrazole |
| 243 | (4-Amino-3-bromo-benzenesulphonyl)-butanesulphonamide | N-ethyl-N-benzyl-3-methylaniline |
| 244 | " | N-ethyl-N-$\beta$-cyanoethyl-3-methylaniline |
| 245 | " | 2-phenyl-indole |
| 246 | " | 1-methyl-2-phenyl-indole |
| 247 | " | 2-methyl-7-chloro-indole |
| 248 | " | 2-methyl-indole-sulphonic acid |
| 249 | (4-Amino-3-methyl-benzenesulphonyl)-p-toluenesulphonamide | N,N-diethyl-3-acetylaminoaniline |
| 250 | " | N-ethyl-N-$\beta$-hydroxyethyl-3-methylaniline |
| 251 | " | 2-methyl-indole |
| 252 | " | 2-methyl-5,7-dichloro-indole |
| 253 | " | 2-phenyl-indole |

-continued

| Example | I | II |
|---|---|---|
| 254 | " | 1-phenyl-3-methyl-5-aminopyrazole |
| 255 | " | 1-(2-chlorophenyl)-3-methyl-5-aminopyrazole |
| 256 | (4-Amino-3-methyl-benzenesulphonyl)-butanesulphonamide | N-ethyl-N-β-phenylethyl-3-methylaniline |
| 257 | " | N,N-diethylaniline |
| 258 | " | 1-methyl-3-phenyl-indole |
| 259 | " | 2-phenyl-indole |
| 260 | " | 1-(2-trifluoromethylphenyl)-3-methyl-5-aminopyrazole |
| 261 | (4-Amino-2-trifluoromethyl-benzenesulphonyl)-o-toluenesulphonamide | N-β-cyanoethyl-N-benzyl-3-m3thylaniline |
| 262 | " | N,N-di-n-propyl-3-methylaniline |
| 263 | " | N-β-cyanoethyl-3-benzoylaminoaniline |
| 264 | " | 2-methyl-indole |
| 265 | " | 2-phenyl-indole |
| 266 | " | 1-phenyl-3-ethyl-5-aminopyrazole |
| 267 | (4-Amino-2-trifluoromethyl-benzenesulphonyl)-2-naphthylsulphonamide | N-β-cyanoethyl-N-β-phenylethyl-3-methylaniline |
| 268 | " | N-n-butyl-N-benzyl-3-methylaniline |
| 269 | " | N,N-diethyl-3-methoxyaniline |
| 270 | " | 2-phenyl-indole |
| 271 | " | 2-methyl-indole |
| 272 | (4-Amino-2-trifluoromethyl-5-chloro-benzenesulphonyl)-benzenesulphonamide | N-ethyl-N-β-hydroxyethyl-3-methylaniline |
| 273 | " | N,N-di-β-hydroxyethyl-3-acetylaminoaniline |
| 274 | " | N-ethyl-N-benzyl-3-ethylaniline |
| 275 | " | N,N-diethyl-3-ethoxyaniline |
| 276 | " | N-ethyl-2,5-dimethylaniline |
| 277 | " | N-β-cyanoethyl-2-methoxy-5-methylaniline |
| 278 | " | 1-ethyl-2-phenyl-indole |
| 279 | " | 2-ethyl-indole |
| 280 | " | 2-methyl-indole |
| 281 | " | 1-methyl-2-phenyl-indole-sulphonic acid |
| 282 | " | 2-methyl-6-chloro-indole |
| 283 | (4-Amino-2-trifluoromethyl-5-chloro-benzenesulphonyl)-ethanesulphonamide | N,N-diethyl-3-methylaniline |
| 284 | " | N-ethyl-3-acetylaminoaniline |
| 285 | " | 2-methyl-indole |
| 286 | " | 2-phenyl-indole |
| 287 | " | 1-(2,5-dichlorophenyl)-3-methyl-5-aminopyrazole |
| 288 | " | 1-(2-chlorophenyl)-3-ethyl-5-aminopyrazole |
| 289 | " | 1-(4-tolyl)-3-methyl-5-aminopyrazole |
| 290 | (4-Amino-2-trifluoromethyl-5-bromo-benzenesulphonyl)-p-toluenesulphonamide | N,N-di-β-methoxyethyl-3-methylaniline |
| 291 | " | N,N-diethyl-3-formylaminoaniline |
| 292 | " | 2-methyl-indole |
| 293 | " | 2-phenyl-indole |
| 294 | (4-Amino-2-trifluoromethyl-5-bromo-benzenesulphonyl)-benzenesulphonamide | N,N-diethyl-3-acetylaminoaniline |
| 295 | " | N-β-cyanoethyl-N-β-acetoxyethyl-3-methylaniline |
| 296 | " | N,N-diethyl-3-benzoylaminoaniline |
| 297 | " | N-n-butyl-N-benzyl-3-methylaniline |
| 298 | " | 2-methyl-indole |
| 299 | " | 2-phenyl-indole |
| 300 | " | 2-phenyl-indole-sulphonic acid |
| 301 | " | 1-cyclohexyl-3-methyl-5-aminopyrazole |
| 302 | " | 1-phenyl-3-methyl-5-aminopyrazole |
| 303 | " | 1-(2-trifluoromethylphenyl)-3-methyl-5-aminopyrazole |
| 304 | (4-Amino-2,5-dibromo-benzenesulphonyl)-o-toluenesulphonamide | N,N-di-n-propyl-3-methylaniline |
| 305 | " | N,N-diethyl-3-propionylaminoaniline |
| 306 | " | N-ethyl-N-benzyl-3-methylaniline |
| 307 | " | N,N-diethyl-3-n-propoxyaniline |
| 308 | " | N-β-cyanoethyl-2-chloroaniline |
| 309 | " | N-ethyl-N-β-ethoxyethyl-3-methylaniline |
| 310 | " | 2-methyl-indole |
| 311 | " | 1-methyl-2-phenyl-indole |
| 312 | " | 1,2-dimethyl-indole |
| 313 | " | 1,2,5-trimethyl-indole |
| 314 | " | 1-benzyl-3-methyl-5-aminopyrazole |
| 315 | " | 1-(3-chlorophenyl)-3-ethyl-5-aminopyrazole |
| 316 | " | 1-cyclohexyl-3-methyl-5-aminopyrazole |
| 317 | " | 1-phenyl-3-methyl-5-aminopyrazole |
| 318 | " | 3-methyl-5-aminopyrazole |
| 319 | (4-Amino-3,5-dichlorobenzenesulphonyl)-p-toluenesulphonamide | N,N-diethyl-3-methylaniline |
| 320 | " | N,N-di-n-propylaniline |
| 321 | " | 1-α-phenylethyl-3-methyl-5-aminopyrazole |
| 322 | " | 1-phenyl-3-methyl-5-aminopyrazole |
| 323 | (4-Amino-2,5-dimethylbenzenesulphonyl)- | N,N-diethyl-3-methylaniline |

-continued

| Example | I | II |
|---|---|---|
| | benzenesulphonamide | |
| 324 | " | N-ethyl-N-β-methoxycarbonylethyl-3-methylaniline |
| 325 | " | N,N-diethyl-3-butyrylaminoaniline |
| 326 | " | 2-methyl-indole |
| 327 | " | 1-methyl-2-phenyl-indole |
| 328 | " | 1-ethyl-2-methyl-indole |
| 329 | " | 2-phenyl-indole-sulphonic acid |
| 330 | " | 2-methyl-indole-sulphonic acid |
| 331 | (4-Amino-2,5-dimethylbenzenesulphonyl)-dimethylaminosulphonamide | N-ethyl-N-benzyl-3-methylaniline |
| 332 | " | N,N-diethyl-3-(4-chlorobenzoyl)-aminoaniline |
| 333 | " | |
| 334 | (4-Amino-2-methyl-5-trifluoromethyl-benzenesulphonyl)-p-toluenesulphonamide | N,N-diethyl-3-phenacetylaminoaniline |
| 335 | " | N,N-diethyl-3-methyl |
| 336 | " | 2-methyl-indole |
| 337 | " | 2-phenyl-indole |
| 338 | " | 1-methyl-2-phenyl-indole |
| 339 | " | N-ethyl-N-β-ethoxycarbonyloxyethyl-3-methylaniline |
| 340 | " | 1-(2-chlorophenyl)-3-methyl-5-aminopyrazole |
| 341 | " | 1-(2-trifluoromethyl)-3-methyl-5-aminopyrazole |
| 342 | " | 1-phenyl-3-methyl-5-aminopyrazole |
| 343 | (4-Amino-2-methyl-5-chloro-benzene-sulphonyl)-benzenesulphonamide | N-ethyl-N-β-hydroxyethyl-3-methylaniline |
| 344 | " | N,N-diethyl-3-methylaniline |
| 345 | " | N,N-di-β-hydroxyethyl-3-acetylaminoaniline |
| 346 | " | 2-methyl-indole |
| 347 | " | 2-phenyl-indole |
| 348 | " | 2-phenyl-indole-sulphonic acid |
| 349 | " | 2-methyl-indole-sulphonic acid |
| 350 | " | 1-phenyl-3-methyl-5-aminopyrazole |
| 351 | " | 1-(2-chlorophenyl)-3-methyl-5-aminopyrazole |
| 352 | " | 1-(4-tolyl)-3-methyl-5-aminopyrazole |
| 353 | (4-Amino-2-methyl-5-chlorobenzene-sulphonyl)-p-toluenesulphonamide | 1-(3-chlorophenyl)-3-methyl-5-aminopyrazole |
| 354 | " | 1-(4-chlorophenyl)-3-methyl-5-aminopyrazole |
| 355 | (3-Amino-4-chlorobenzenesulphonyl)-methanesulphonamide | 2-methyl-indole |
| 356 | " | 2-phenyl-indole |
| 357 | "1-phenyl-3-methyl-5-aminopyrazole | |
| 358 | " | N,N-diethyl-3-methylaniline |
| 359 | (3-Amino-6-chlorobenzenesulphonyl)-benzenesulphonamide | 1-methyl-2-phenyl-indole |
| 360 | " | 2-methyl-indole |
| 361 | " | 1,2-dimethyl-indole |
| 362 | " | 1-(4-chlorophenyl)-3-methyl-5-aminopyrazole |
| 363 | (3-Amino-benzenesulphonyl)-p-toluene-sulphonamide | 2-methyl-indole |
| 364 | " | 2-phenyl-indole |
| 365 | " | 1-(2-trifluoromethylphenyl)-3-methyl-5-aminopyrazole |
| 366 | (3-Amino-4-methyl-benzenesulphonyl)-butanesulphonamide | N,N-diethyl-3-methylaniline |
| 367 | " | 2-methyl-indole |
| 368 | " | 1,2-dimethyl-indole |
| 369 | (3-Amino-6-methyl-benzenesulphonyl)-benzenesulphonamide | 2-methyl-indole |
| 370 | " | 2-phenyl-indole |
| 371 | " | 1-methyl-2-phenyl-indole |
| 372 | (3-Amino-4-methoxy-benzenesulphonyl)-p-toluenesulphonamide | N,N-diethyl-3-methylaniline |
| 373 | (3-Amino-6-ethyl-benzenesulphonyl)-o-toluenesulphonamide | N,N-diethyl-3-acetylaminoaniline |
| 374 | " | N-ethyl-N-β-hydroxyethyl-3-methylaniline |
| 375 | " | 2-methyl-indole |
| 376 | " | 1-phenyl-3-methyl-5-aminopyrazole |
| 377 | (3-Amino-benzenesulphonyl)-benzene-sulphonamide | 2-methyl-indole |
| 378 | " | 2-phenyl-indole-sulphonic acid |
| 379 | (3-Amino-4-chloro-5-methyl-benzene-sulphonyl)-butanesulphonamide | N-ethyl-N-β-phenylethyl-3-methylaniline |
| 380 | " | 2-methyl-indole |
| 381 | " | 2-phenyl-indole |
| 382 | " | 1,2-dimethyl-indole |
| 383 | " | 1-phenyl-3-methyl-5-aminopyrazole |
| 384 | (4-Amino-benzenesulphonyl)-2-naphthyl-sulphonamide | N,N-diethyl-3-methylaniline |
| 385 | " | 2-methyl-indole |
| 386 | (2-Amino-3-chloro-4-methoxy-benzene-sulphonyl)-benzenesulphonamide | 2-methyl-indole |

-continued

| Example | I | II |
|---|---|---|
| 387 | " | 2-phenyl-indole |
| 388 | (2-Amino-benzenesulphonyl)-p-toluene-sulphonamide | N,N-diethyl-3-acetylaminoaniline |
| 389 | " | 2-methyl-indole |
| 390 | " | 2-phenyl-indole |
| 391 | " | 1-(4-chlorophenyl)-3-methyl-5-aminopyrazole |
| 392 | " | 1-(2-trifluoromethylphenyl)-3-methyl-5-aminopyrazole |
| 393 | (3-Amino-4-trifluoromethyl-benzenesulphonyl)-benzenesulphonamide | N,N-diethyl-3-methylaniline |
| 394 | " | 2-methyl-indole |
| 395 | " | 2-phenyl-indole |
| 396 | " | 2-methyl-7-chloro-indole |
| 397 | " | 2,5-dimethyl-indole |
| 398 | " | 1-β-cyanoethyl-3-methyl-5-aminopyrazole |
| 399 | " | 1-phenyl-3-methyl-5-aminopyrazole |
| 400 | " | 1-(2-trifluoromethylphenyl)-3-methyl-5-aminopyrazole |
| 401 | " | 1-(4-chlorophenyl)-3-methyl-5-aminopyrazole |
| 402 | (4-Amino-2,5-bis-(trifluormethyl)-benzenesulfonyl)-benzenesulfonamid | 2-methyl-indole |
| 403 | " | 2-phenyl-indole |
| 404 | " | N,N-diethyl-3-methylaniline |
| 405 | (4-Amino-3,5-bis-(trifluormethyl)-benzenesulfonyl)-p-chlor-benzenesulfonamide | 2-methyl-indole |
| 406 | " | 1-methyl-2-phenyl-indole |
| 407 | (4-Amino-2,5-bis-(trifluormethyl)-benzenesulfonyl-p-toluenesulfonamid | 2-methyl-indole |
| 408 | " | N-ethyl-N-β-cyano-ethyl-3-methyl-aniline |

We claim:

1. Monoazo dyestuff, which in the form of the free acid, has the formula

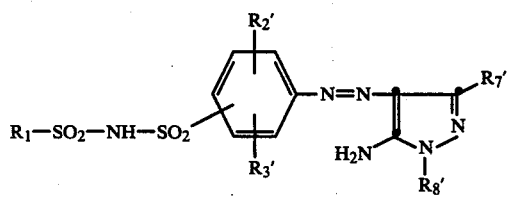

wherein
$R_1$ is phenyl; phenyl substituted by $C_1$-$C_4$-alkyl, $C_1$-$C_4$-alkoxy, halogen, nitrile or nitro; 1-naphthyl; 2-naphthyl; $C_1$-$C_4$-alkyl; or dialkylamino in which the alkyl group contains 1 to 4 carbon atoms;
$R_2'$ is hydrogen, chlorine, bromine, methyl, ethyl or trifluoromethyl;
$R_3'$ is hydrogen, chlorine, bromine, methyl, ethyl or trifluoromethyl;
$R_7'$ is methyl;
$R_8'$ is $C_1$-$C_4$-alkyl; phenyl; or phenyl substituted by halogen, nitrile, nitro, formylamino, acetylamino, propionylamino, β-chloropropionylamino, butyrylamino, methylsulphonylamino, phenylsulphonylamino, hydroxyacetylamino, phenoxyacetylamino, benzoylamino, p-chlorobenzoylamino, 2,5-dichlorobenzoylamino, phenacetylamino, ethoxycarbonylamno, methoxycarbonylamino, propoxycarbonylamino, furanoyl, thenoyl, $C_1$-$C_4$-alkyl, trifluoromethyl, $C_1$-$C_4$-alkoxy, amino, or amino substituted by $C_1$-$C_4$-alkyl; and the disulphimide group is in the o-, m- or p-position relative to the azo bridge.

2. Monozao dyestuff of claim 1, which in the form of free acid has the formula

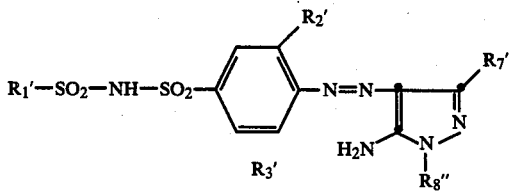

wherein
$R_2'$ and $R_3'$ and $R_7'$ have the same meaning as in claim 1;
$R_1'$ is alkyl with 1-4 C atoms; phenyl; or phenyl substituted by $C_1$-$C_4$-alkyl, $C_1$-$C_4$-alkoxy or halogen; and
$R_8''$ is phenyl; or phenyl substituted by halogen, $C_1$-$C_4$-alkyl or trifluoromethyl.

* * * * *

UNITED STATES PATENT AND TRADEMARK OFFICE
CERTIFICATE OF CORRECTION

PATENT NO. : 4,159,265
DATED : June 26, 1979
INVENTOR(S) : SOMMER et al.

It is certified that error appears in the above-identified patent and that said Letters Patent are hereby corrected as shown below:

In the Abstract, [57], second line after first formula, correct the spelling of "coupling".

Column 14, line 15, insert -- $H_2N$ -- in the formula.

Column 22, Example 261, Column II, "m3thylaniline" should read -- methylaniline --.

Column 24, Example 333, Column II, insert -- 2-methyl-indole --

Column 23, Example 357, Move Column I recitation to Column II and insert -- (3-Amino-4-chlorobenzenesulphonyl)-methanesulphonamide -- in Column I.

Signed and Sealed this

Twentieth Day of November 1979

[SEAL]

Attest:

RUTH C. MASON
Attesting Officer

LUTRELLE F. PARKER
Acting Commissioner of Patents and Trademarks